(12) United States Patent
Shepherd

(10) Patent No.: US 7,232,517 B1
(45) Date of Patent: Jun. 19, 2007

(54) PASSIVE FREESTANDING PORTABLE LIQUID FILTRATION DEVICE

(75) Inventor: James B. Shepherd, Dalhart, TX (US)

(73) Assignee: The James Bryson Shepherd Trust, Arlington, TX (US)

(*) Notice: Subject to any disclaimer, the term of this patent is extended or adjusted under 35 U.S.C. 154(b) by 416 days.

(21) Appl. No.: 10/788,914

(22) Filed: Feb. 27, 2004

Related U.S. Application Data

(60) Provisional application No. 60/449,767, filed on Feb. 27, 2003.

(51) Int. Cl.
B01D 35/027 (2006.01)

(52) U.S. Cl. .................. 210/94; 210/232; 210/249; 210/316; 210/418; 210/474; 210/476; 210/482; 210/495; 210/499; 250/435

(58) Field of Classification Search .................. 210/94, 210/192, 244, 245, 249, 250, 474, 476, 482, 210/495, 499, 748, 232, 316, 337, 418; 222/189.06; 250/434, 435
See application file for complete search history.

(56) References Cited

U.S. PATENT DOCUMENTS

| 403,261 | A |   | 5/1889  | Funck             |         |
|---------|---|---|---------|-------------------|---------|
| 513,802 | A | * | 1/1894  | Luscombe          | 210/476 |
| 1,284,233 | A | * | 11/1918 | Caen            | 210/323.1 |
| 1,629,269 | A | * | 5/1927  | Hagg              | 210/282 |
| 1,645,712 | A | * | 10/1927 | Meyers            | 210/265 |
| 1,645,818 | A | * | 10/1927 | Overboe           | 210/495 |
| 1,674,203 | A | * | 6/1928  | Clifford et al.   | 210/266 |
| 2,177,337 | A |   | 10/1939 | Stein             |         |
| 4,899,057 | A | * | 2/1990  | Koji              | 250/436 |
| 5,128,036 | A | * | 7/1992  | Svensson          | 210/264 |
| 5,178,450 | A |   | 1/1993  | Zelensky et al.   |         |
| 5,307,250 | A |   | 4/1994  | Pearson           |         |
| 5,562,824 | A | * | 10/1996 | Magnusson         | 210/266 |
| 5,624,177 | A |   | 4/1997  | Rosaia            |         |
| 5,697,505 | A |   | 12/1997 | Sprague           |         |
| 5,743,620 | A |   | 4/1998  | Rojas et al.      |         |
| 6,086,216 | A |   | 7/2000  | Goldfarb          |         |
| 6,174,066 | B1 |  | 1/2001  | Vinding-Diers     |         |
| 6,419,821 | B1 | * | 7/2002 | Gadgil et al.     | 210/86  |
| 6,514,405 | B1 | * | 2/2003 | Lifschitz         | 210/143 |
| 6,602,410 | B1 | * | 8/2003 | Tanner et al.     | 210/201 |

* cited by examiner

Primary Examiner—Matthew O. Savage
(74) Attorney, Agent, or Firm—Mark W. Handley

(57) ABSTRACT

A freestanding portable liquid filtration device (18) having an upper housing (24), a lower housing (32) and a base (36) which are secured together with an interference fit, with an enclosed lower portion of the upper housing (24) fitting within an open top of the lower housing (32) and an enclosed bottom of the lower housing (32) fitting within an upwardly facing opening of the base (36). A filtration element (26) having a first portion disposed with the upper housing (24) and a second portion from which fluid is discharged disposed within the lower housing (32), wherein liquid flows from the upper housing (24) through the filtration element (26) and into the lower housing (32). The upper and lower housings (24, 32) being formed of transparent materials, and the lower housing (32) including a light source (38) for illuminating at least a portion of the lower housing (32).

21 Claims, 4 Drawing Sheets

PASSIVE FREESTANDING PORTABLE LIQUID FILTRATION DEVICE

CROSS-REFERENCE TO RELATED APPLICATION

The present application is a Continuation of U.S. Provisional Patent Application Ser. No. 60/449,767, filed Feb. 27, 2003, and invented by James B. Shepherd.

TECHNICAL FIELD OF THE INVENTION

The present invention relates in general to liquid filtration, specifically to such liquid filtration wherein external means of forcing liquids through filter elements, such as electricity or water pressure, are not available and or in situations wherein portability is advantageous.

BACKGROUND OF THE INVENTION

There is a great need for the effective passive filtration of liquids in remote areas, third world countries and by those who are mobile and for those who may not have access to modes of filtration that rely on electricity, water pressure or other external means of forcing such liquids through a filtration element.

The use for such filtration devices encompasses the need to filter such liquids as fuels, solvents, chemicals such as herbicides and pesticides, lubricants, water and such.

Examples of such need are missionaries who travel from place to place in remote areas of third world countries, personal involved in military expeditions, relief organizations that go into disaster areas such as earthquakes, floods, storm areas, war torn areas, and the like. Individuals involved in recreational activities such as hunting, camping, mountain climbing, and RV travel. Also in situations wherein activity is taking place in remote cabins and properties that do not have access to such things as treated water or electricity. In such situations where electricity may not be present, there is often a need to be able to filter various liquids in periods wherein no or low light conditions exist such as is found at nighttime, inside caves, and other dark enclosures. In such environments, portability of the filtration system is often a requirement.

Water is one of the most common liquids requiring filtration in environments wherein external means for forcing the liquid though a filtration element is not available. In such situations portability is often a requirement. For example missionaries who travel from place to place in remote areas of third world countries, military personal, relief organizations providing relief to various disaster areas throughout the globe, individuals involved in recreational activities such as hunting, camping, mountain climbing, RV travel, etc. Portability is also a big need for many health conscious individuals traveling to various locations on a regular basis; this is especially true for those who travel to countries outside the US such as businessmen and diplomats.

Most water filtration systems require some external means of forcing water through a water filter; the most common means are pumps requiring the use of electricity or water pressure provided from municipal facilities. Water filtration companies have long sought for adequate solutions when these are not available. The most common solution for creating pressure to force water through a filtration element is through the use of manual pump devices. However, these have three drawbacks that can make them inconvenient and often impractical in meeting the above needs. First, to force water through a filtration element with a pore structure small enough to remove pathogenic bacteria, filtering as little as 16 ounces of water can be quite exhausting. Second, such devices are virtually useless when large volumes of filtered water are required such as is found in war torn areas or other disaster areas wherein large numbers of people have been affected. Thirdly, such systems require travel to the source of water at the time when water is required. This may not be practical in certain situations such as in warfare conditions or at night when it may be difficult or nearly impossible to find such sources of water when no or low light conditions exist.

Passive systems that do not require any manual means for forcing the water through a filter element are more practical for such situations. These systems are generally referred to as drip filters or gravity filters. The most common design for such passive systems consists of an upper housing containing a filtration element and a lower housing. Raw unfiltered water is poured into the upper housing, the water then passes through a filtration element as it seeks a lower level and passes into the lower housing, which collects the filtered water. The filtered water is then accessed through the use of a flow control valve attached to the lower housing. In other embodiments, the flow control valve may be replaced with a fitting to which a flow line is connected. Such systems are practical because they do not require that they be tended while the filtration process is taking place. The user fills the upper housing with unfiltered water and is then able to leave the system unattended. The system will automatically filter the water over time thus freeing the user to attend to other matters while the process of filtration is taking place.

SUMMARY OF THE INVENTION

A passive freestanding portable liquid filtration device is provided having transparent upper and lower housings, and an attachable elevated base. Joining mechanisms are provided that enable the entire system to be joined together and transported as a unit. Exteriorly extending ribs are provided for deflecting unfiltered liquids which may overflow of the upper housing to prevent such unfiltered liquids from entering into the lower housing. Internal lighting is provided, which may include an ultraviolet light source for further treatment of liquids within the filtration device. A pre-filtration device is provided for pre-filtering liquids being poured into the filtration device. A means is provided to combine the "push" of gravity with a siphon "pull" on the liquid to increase the flow rate of liquids passing through a filtration element of the filtration device. A back-flush hose is provided for back-flushing the filtration elements included in the filtration device.

DESCRIPTION OF THE DRAWINGS

For a more complete understanding of the present invention and the advantages thereof, reference is now made to the following description taken in conjunction with the accompanying Drawings which show various aspects and ornamental designs for a passive, freestanding portable liquid filtration device made according to the present invention, as set forth below.

DETAILED DESCRIPTION OF THE INVENTION

Figure 1:
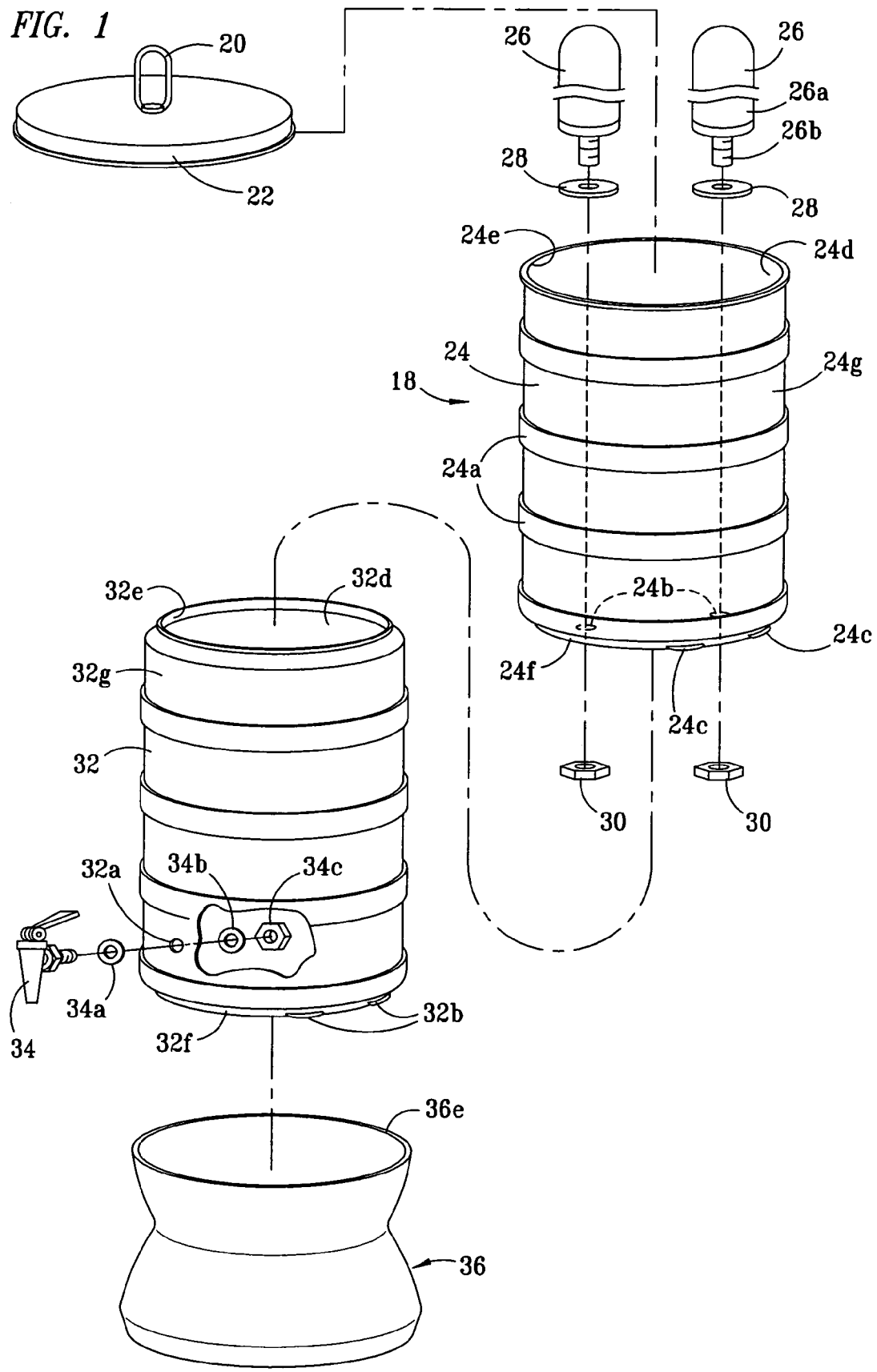
FIG. 1 is a perspective right side view of a passive freestanding portable liquid filtration device constructed in accordance with the invention.

FIG. 1 shows a perspective right side view of a preferred embodiment of the passive freestanding portable liquid filtration device 18 of the present invention. The upper portion of the invention has a loop or knob 20 which provides a handle for a Lid 22. The lid 22 covers an upper housing 24 for unfiltered liquids. The upper housing 24 defines an upper chamber 24d with a fully open upper end 24e and an enclosed lower end 24f. The upper housing 24 has sidewalls 24g into which are molded has molded liquid shedding ribs 24a. The upper housing 24 has a series of joining nipples 24c for securing it to attachable and detachable lower housing 32, around the circumference of its base. Preferably, there are two sets of lateral protuberance provided by joining nipples 24c which are molded into the upper housing 24, with each of a set spaced apart at approximately twenty degrees, and opposite sets of joining nipples spaced apart 180 degrees. The lateral protuberances provided by the joining nipples 24c extend from the laterally from the sides of the enclosed bottom 24f for approximately one-half inch with a width of one-eight inch, and provide an interference fit with the open end 32d of the lower housing 32 for securing the upper housing 24 to the lower housing 32. The upper housing 24 has apertures provided by upper housing filter element holes 24b in the lower end 24f through which filtration elements 26 are inserted. The filtration elements 26 are designed is such a manner that liquids pass through an exterior surface 26a provided by an outer filtration shell, through the filter media of the filter element 26, into the inner bore of the filter element 26, and then down through a hollow stem 26b and into the lower housing 32. The hollow stem 26b is threaded and defines a protuberant lower end portion of the filtration element 26. A gasket 28, preferably a rubber washer, inserts onto the exterior of the said hollow stem 26b. The filtration element(s) 26 is then placed into the upper housing 24 in such a manner that the hollow stem 26b passes through the upper housing filter element holes 24b and is secured in place with a filtration element fastening mechanism 30, which preferably are threaded fasteners which threadingly secure to respective ones of the hollow stems 26b. In the preferred embodiment, both the hollow stem 26b and the fastening mechanism 30 are threaded; the filtration element fastening mechanism 30 can be a threaded wing nut.

The lower housing 32 is constructed to define a lower chamber 32d having a fully top opening 32e, an enclosed bottom 32f, and a sidewall 32g. The top opening 32e is slightly oval, having a different in diameter of approximately 3/16 of an inch for an approximately eight inch opening. The opening 32e will receive the lower end 24f and the joining nipples 24c of the upper housing 24 with a slight interference fit to removably secure the upper housing 24 within the lower housing. The upper housing 24 may be rotated relative to the lower housing 32 around a vertical axis to provide a tighter fit for the nipples 24c within the oval-shaped interior of the opening 32e. The lower housing 32 has two sets to two of exterior protuberances 32b provided by joining nipples 32b which are molded into the lower housing 32, with each set of joining nipples 32b spaced apart at approximately twenty degrees, and opposite sets of joining nipples spaced apart 180 degrees. The exterior protuberances provided by the joining nipples 24a extend from the laterally from the sides of the enclosed bottom 24f for approximately one-half inch with a width of one-eight inch, and provide an interference fit with the open end 32d of the lower housing 32 for securing the upper housing 24 to the lower housing 32. These joining nipples for base 32b serve as pressure fittings allowing an attachable and detachable base 36 to be joined with the said lower housing 32. The said lower housing 32 has a lower housing flow control valve hole 32a in its sidewall, near its base.

An exterior gasket mechanism 34a is provided for a flow control valve 34, which in the preferred embodiment this is a rubber washer. The flow control valve 34 has an exteriorly threaded stem which is inserted through a hole 32a in a lower portion of a sidewall 32g of the lower housing 32. An interior gasket 34b is provided for the flow control valve 34b, and in the preferred embodiment this is a rubber washer which is fitted onto the flow control valve 34 stem. The flow control valve 34 is secured within the hole 32a by a threaded fastener 34c. In the preferred embodiment the fastener 34c both is a nut or a wing nut.

The base 36 is constructed with an opening 36e which is slightly oval, preferably of the size as the opening 36e of the lower housing 32. The opening 32e of the base 36 will receive the lower end 32f of the lower housing 32 and the joining nipples for base 32b with an interference fit. After the upper housing 24, the lower housing 32 and attachable and the detachable base 36 have been joined, these components can later be disassembled for cleaning, maintenance, transport or any other need. In the preferred embodiment the upper housing 24, the lower housing 32 and the base 36 are blow molded utilizing transparent polycarbonate, such as Lexan® available from GE Pastics of Southfield, Michigan. However, the upper housing 24, the lower housing 32 and the detachable base 36 can consist of any other rigid material that will not leach unacceptable contaminates into the liquid being filtered, such as stainless steel, polyethylene, various impregnated or laminated fibrous materials, various plasticized materials, various metallic materials, various glass materials, various polymers etc. In other embodiments, the flow control valve 34 may be replaced with a fitting to which a flow line is connected.

Figure 2:
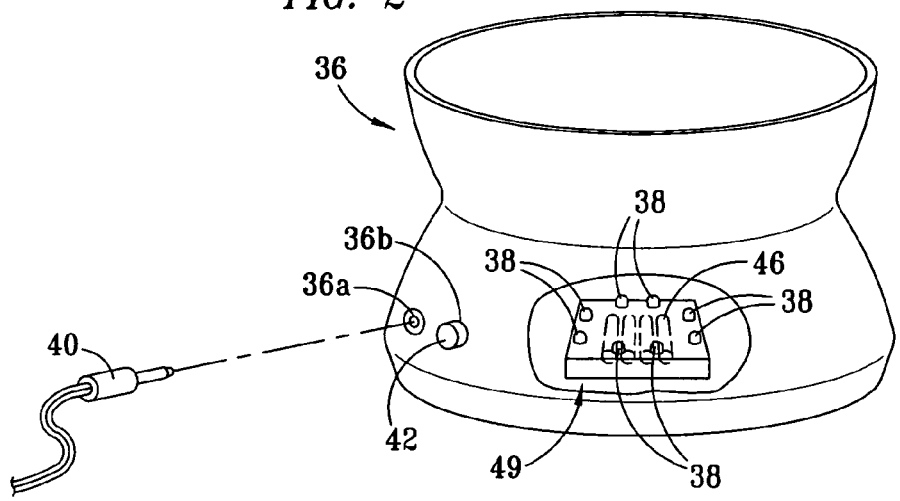
FIG. 2 is a perspective right side view of an alternative embodiment of a base of the passive freestanding portable liquid filtration device constructed in accordance with an alternative mode which includes a light emitting mechanism to be used in conjunction with the invention.

FIG. 2 shows a perspective right side view of an alternative embodiment of a base of the passive freestanding portable liquid filtration device constructed in accordance with an alternative mode which includes a light emitting mechanism 49. The base 36 can consist of the base itself without a light emitting mechanism 49. Preferably, the light emitting mechanism 38 is secured to the bottom of the base 36, raised above the bottom of the base 36 by a slight amount by a standoff, or mounting tabs. The light emitting mechanism 49 preferably includes batteries 46 and light sources 38. Light sources 38 are preferably provided by L.E.D.s, which may be of any color, such as red, green, blue, white, yellow and such. In some embodiments, the light sources 38 may be provided by ultraviolet light sources, such as L.E.D.s which emit ultraviolet light. A set of rechargeable batteries 46 is included in the light emitting mechanism 49. In this alternative embodiment the attachable and detachable base 36 has two holes, an electrical power supply connector 36a and an on-off switch hole 36b into which are inserted an electrical power supply connector 40 and an on off switch 42, respectively. The electrical power supply connector 40 and an on off switch 42 are then connected to the light emitting mechanism 49 and rechargeable batteries 46 utilizing standard electrical wiring means.

Figure 3:
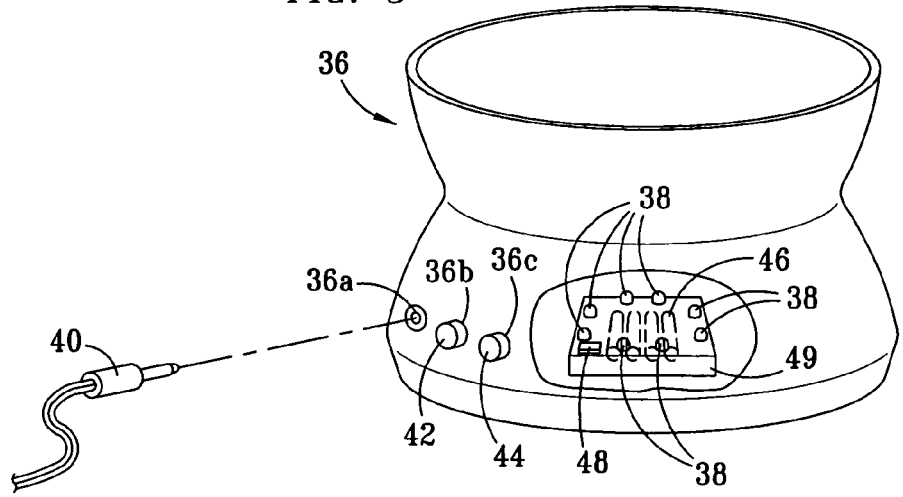
FIG. 3 is a perspective right side view of the base of the passive freestanding portable liquid filtration device constructed in accordance with a second alternative embodiment which includes a light emitting mechanism and a microprocessor to be used in conjunction with the invention.

FIG. 3 shows a perspective right side view of the base 36 of the passive freestanding portable liquid filtration device constructed in accordance with a second alternative embodiment which includes a light emitting mechanism 49 with an onboard microprocessor 48. The microprocessor 48 controls operation of the lights, such that various light displays may be provided. The light emitting mechanism 49 is secured to the bottom of the base 36, with the light emitting mechanism 49 raised from the bottom surface of the base with mounting tabs (now shown). A set of rechargeable batteries 46 are included in the light emitting mechanism 49. The attachable and detachable base 36 has three holes, a hole of an electrical power supply connector 36a, a hole 36b for an on-off switch 42, and a hole 36c for a microprocessor switch 44. An electrical power supply connector 40 is inserted into the connector 36a. An on off switch 42 is mounted in the hole 36b. A microprocessor function switch 44 is mounted in the hole 36c. The wires of the electrical power supply connector 40, the on off switch 42 and the microprocessor function switch 44 are then connected to the light emitting mechanism 49, the rechargeable batteries 46 and the microprocessor 48 utilizing standard electrical wiring means. Light sources 38 are preferably provided by L.E.D.s, which may be of any color, such as red, green, blue, white, yellow and such. In some embodiments, the light sources 38 may be provided by ultraviolet light sources, such as L.E.D.s which emit ultraviolet light. A set of rechargeable batteries 46 is included in the light emitting mechanism 49.

Figure 4:
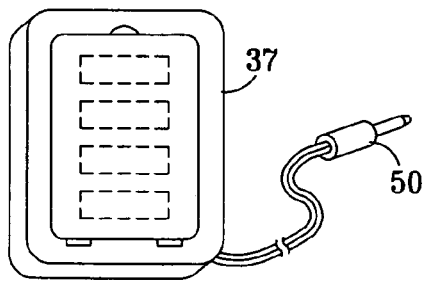
FIG. 4 is a perspective right side view of an auxiliary battery pack, which can be used in conjunction with the invention to power the light emitting mechanism.

FIG. 4 shows a perspective right side view of an auxiliary battery pack 37, which can be used in conjunction with the invention to power the light emitting mechanism 49. The auxiliary battery pack 37 has a power supply plug, which plugs into an electrical power supply connector 36a of the base 36, and can be used to provide power to the microprocessor 48 and or light emitting mechanism 49.

Figure 5:
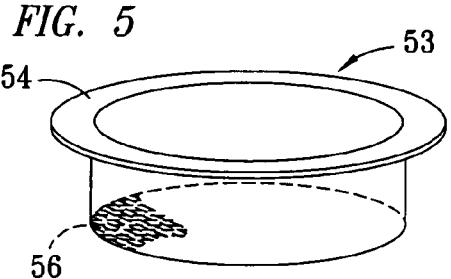
FIG. 5 is a perspective right side view of a prefiltration device which can be used in conjunction with the invention to prefilter liquids.

FIG. 5 shows a perspective right side view of a prefiltration device 53. The filtration device 53 has a nesting rim 54 which rests upon the top surface of the upper housing 24 and holds the pre filtration device 43 in place. A prefiltration screen 56 is attached to the nesting rim 54.

Figure 6:
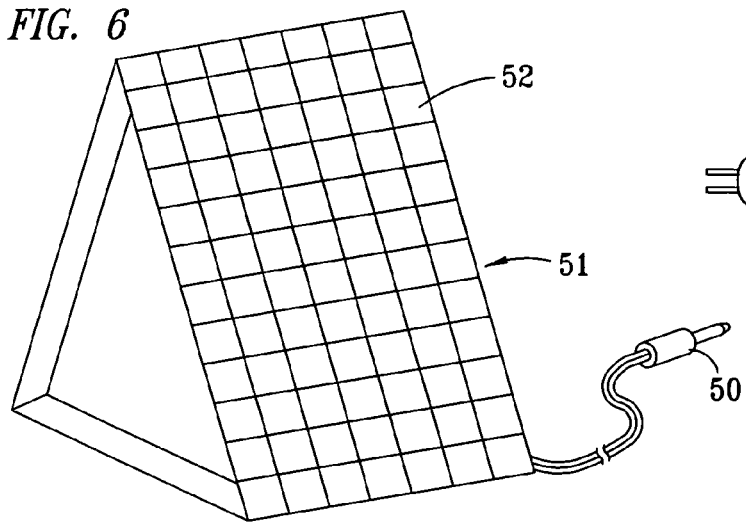
FIG. 6 is a perspective right side view of a solar power device which can be used in conjunction with the invention to power the light emitting mechanism.

FIG. 6 shows a perspective right side view of a solar power device 51, which can be used in conjunction with the invention. The solar power device 51 has a solar panel 52 and power supply plug 50, which plugs into an electrical power supply connector 36a and can be used to provide power to the microprocessor 48 and the light emitting mechanism 49 and to charge the rechargeable batteries 46.

Figure 7:
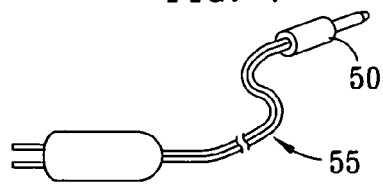
FIG. 7 is a perspective right side view of an electrical power supply plug which can be used in conjunction with the invention.

FIG. 7 shows a perspective right side view of an electrical power cord 55 having a plug 50 which can be used in conjunction with the invention. The electrical power cord 55 connects into an electrical wall jack and with the connector plug 50 connecting to a base 36 at a connector 36a (shown in FIGS. 2 and 3). The power supply cord 55 may be used to provide power to the microprocessor 48 and or light emitting mechanism 49 and to charge the rechargeable batteries 46.

Figure 8:
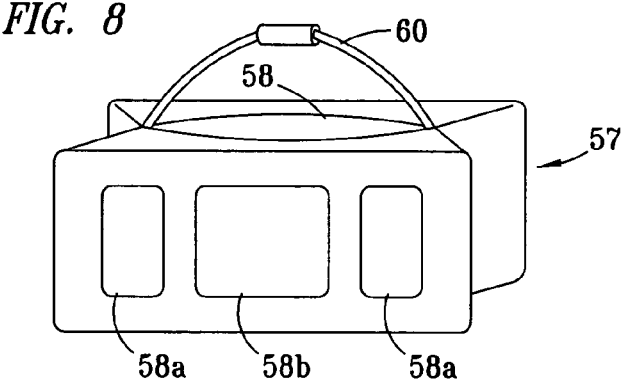
FIG. 8 is a perspective right side frontal view of a portable carrying case which can be used in conjunction with the invention to transport the invention and its accessories.

FIG. 8 shows a perspective right side frontal view of a portable carrying case 57, which can be used in conjunction with the portable liquid filtration device 18 and its accessories. The carry case 57 has a system components cavity 58 for the lid 22, the upper housing 24, the lower housing 32 and the base 36. The front side of the case 57 has filtration element pouches 58a to hold the filtration elements 26 and a pre filtration device pouch 58b to hold the pre filtration device 53 of FIG. 5. Carrying strap 60 is attached to portable carrying case 57.

Figure 9:
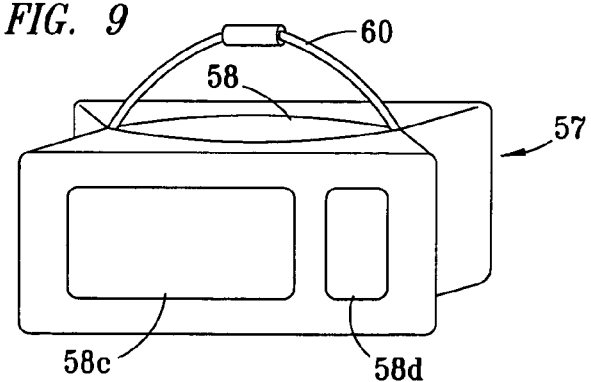
FIG. 9 is a perspective right side rear view of the portable carrying case which can be used in conjunction with the invention to transport the invention and its accessories.

FIG. 9 shows a perspective right side rear view of the portable carrying case 57, which can be used in conjunction with the invention to transport the portable liquid filter device 18 and its accessories. The carrying case 57 has a system components cavity 58 for the lid 22, upper housing 24, the lower housing 32 and the base 36. The backside of the said carrying case 57 has a solar power device pouch 58c to hold the solar power device 51 of FIG. 6. The carrying case 57 also has an auxiliary battery power supply pouch 58d to hold auxiliary battery power supply 37 of FIG. 4.

Figure 10:
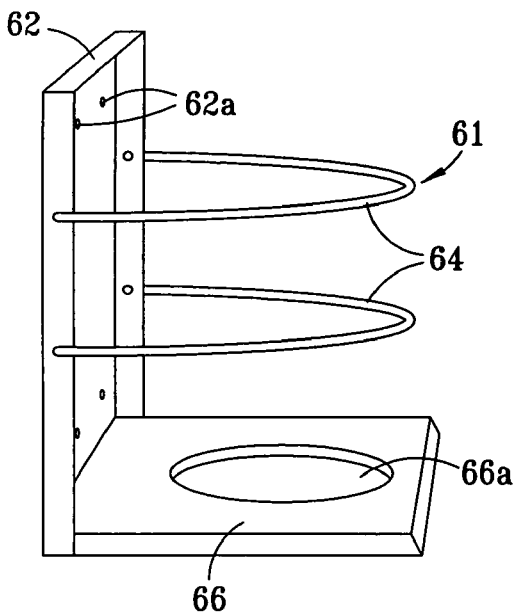
FIG. 10 is a perspective right side view of a vertical mount device which can be used to in conjunction with the invention to secure the invention to a vertical surface.

FIG. 10 shows a perspective right side view of a vertical mount bracket 61, which can be used to secure the portable filter device 18 to a vertical surface. The mount bracket 61 has a mounting backboard 62 with backboard fastening holes 62a through which the vertical mount bracket 61 is secured to a vertical surface by fastening mechanisms such as screws. The bracket 61 has a vertical mount platform 66 which has a cavity 66a into which the base 36 fits. The said filtration device 18 is held into place by a securing strap(s) 64.

Figure 11:
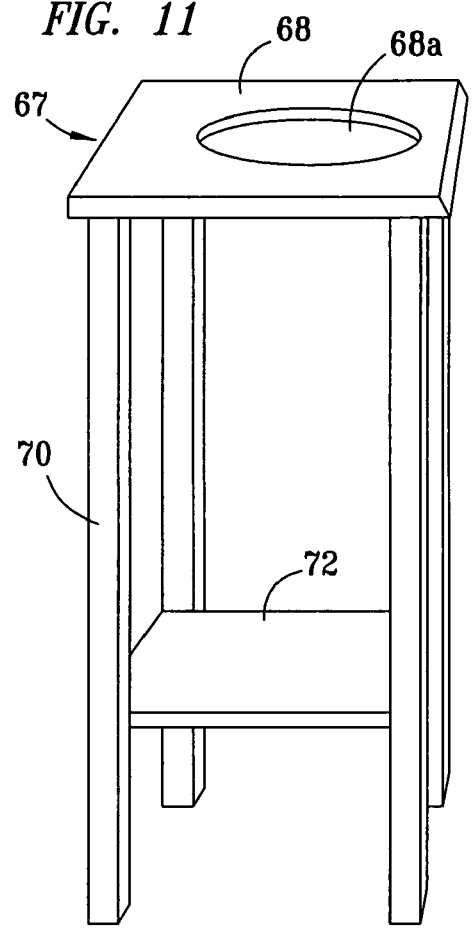
FIG. 11 is a perspective right side view of a freestanding pedestal device which can be used in conjunction with the invention as an elevated holding platform for the invention.

FIG. 11 shows a perspective right side view of a freestanding pedestal stand 67, which can be used as an elevated, holding platform for the portable filtration device 18. The stand 67 has a platform 68 which has a cavity 68a into the base 36 removably fits. The platform 68 is elevated by legs 70 and reinforced by a stabilizing mechanism 72.

Figure 12:
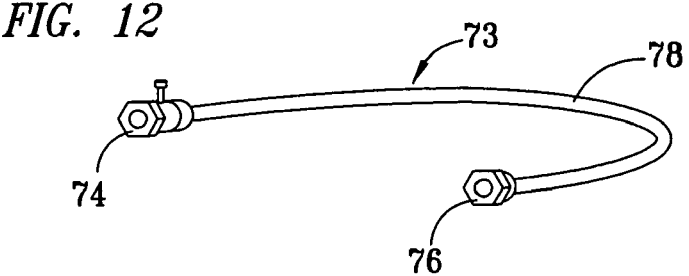
FIG. 12 is a perspective right side view of a siphon priming and back flushing device which can be used in conjunction with the invention to prime the filtration elements and as a back flushing device to back flush and clean the filtration element(s).

FIG. 12 shows a perspective right side view of a perspective right side view of a siphon priming and back flushing device 73, which can be used in conjunction with the invention to prime the filtration elements 26 for siphoning and as a back flushing device to back flush and clean the filtration elements 26. The siphon priming and back flushing device 73 has a connector 74 which connects to a pressurized liquid outlet that can force pressurized liquid through the device. The connector 74 is attached to a liquid conduit device 78 which transports pressurized liquids. The conduit device 78 is attached to a filtration element connecting device 76, which an be connected to filtration elements 26.

In operation one removes a lid 22 and pours an unfiltered liquid into an upper housing 24 and replaces the lid 22. The lid 22 prevents external contaminates from entering the liquid being filtered. The upper housing 24 has molded liquid shedding ridges provide by the ribs 24a which serve to strengthen the structure and, more importantly, to direct away from the housing 24 any unfiltered liquids that may spill due to overfilling, and thus preventing unfiltered liquids from entering the lower housing 32 and contaminating filtered liquids. The pressure generated from the liquid seeking a lower level moves the liquid through a filtration elements 26 in which contaminates are captured and separated from the liquid. The filtered liquid then passes out of the filtration elements 26 and into the lower housing 32 where it can be drawn off through a flow control valve 34. The portable filtration device 18 is joined together during use. The upper housing 24, the lower housing 32 and the base 36 may be transported as one assembled unit, or may be separated for cleaning, maintenance, transport or any other need.

Often the user desires to refill the upper housing 24 when all the liquids in the upper housing 24 have not yet passed through the filtration elements 26 and liquids within said lower housing 32 have not been fully evacuated from the portable filtration device 18. With opaque housings this becomes difficult and risky. For the user to check the liquid levels, the upper housing 24 must be removed from the lower housing 32. During this period liquids continue to exit the filtration elements 26, dripping the liquids outside of the lower housing 32 while the user checks for liquid levels in the lower housing 32. If this cumbersome and messy procedure is not followed and the user does not check the liquid level in the lower housing 32, the user risks overfilling the upper housing 24 only to later discover that the lower housing 32 has overflowed. Such overflows could potentially create serious problems for the user. When the upper housing 24 and the lower housing 32 are constructed of transparent material, as is the preferred embodiment of the present invention, the above defect is corrected. The user is then enabled to see the liquid levels in both the upper housing 24 and the lower housing 32 without the necessity of removing the upper housing 24, and is thus able to determine the proper liquid level to achieve in the upper housing 24 so as not to overflow the lower housing 32.

Because the invention can be joined together with the joining nipples 24c and 32b, the user is provided with several advantages not available with other filtration systems that can not be joined together. The portable filtration system 18 of the present invention provides the ability to filter liquids in vehicles while they are in transit such as RV's, motor homes, tractor trailer cabs, and such. This is because the invention will not come apart and it can be fastened to vertical surfaces utilizing the vertical mount bracket 61 of FIG. 10. With filter systems that cannot be joined this is not an option because the upper housing is held in place merely by its own weight and the centrifugal and vibrational forces during transit would overcome the gravitational force that holds the system together and in place. Additionally the user is able to conveniently move the invention while filtration is taking place. This can be important in situations such as when the liquid being filtered is water and the invention is first being used in an area for food preparation and then later in another location such as a dining area. With un-joined systems this defect can create a messy relocation procedure. If the upper housing is full of water it becomes top heavy and it's difficult to balance the system while carrying it by the lower housing. The typical solution is to remove the upper housing and place it by a drain, then move the lower housing to the desired location, then transfer the upper housing to the desired location and set it on top of its lower housing. During such relocations the upper housing continues to drip water from the upper housing through the filter elements and onto the floor. More importantly, the stem of the filtration elements, where the filtered fluids exit the filtration elements, can become contaminated with impurities and microbiological organisms which in turn can contaminate filtered fluids. Another solution to deal with this defect is to empty both the upper and lower housings of the system, relocate the system then refill the system. This defect becomes more pronounced as the size and capacity of the system is increased.

When my passive freestanding portable liquid filtration device 18 is constructed in the preferred embodiment, the lower housing 32 takes on the unexpected characteristic of being an amplifier or echo chamber. This results in the sound of the liquid droplets being amplified as they hit the surface of the filtered liquids in the said lower housing 32, creating the delightful and relaxing sound of falling rain drops.

The base 36 can consist of the base itself, or the base 36 in combination with a light emitting mechanism 49. It may also be configured with or without a microprocessor 48. When the user utilizes the alternative embodiments of FIG. 2 or 3, this provides different practical and commercial advantages. For uses such as water filtration, the passive freestanding portable liquid filtration device 18 with the light emitting mechanism 49 serves as an emergency light in emergency situations, as a camping light in outdoor recreational situations and as a beacon for the water supply in no or low light conditions. One of the unexpected ancillary benefits of having the light shine up through the lower housing 32 is that it causes droplets of filtered liquid to light up and glow upon hitting the surface of the filtered liquids. The surfaces waves, caused by the droplets, also glow and reflect light onto the surface area of walls, ceilings and other objects. These lighting effects along with the soothing sound of raindrops combine to create a very compelling, relaxing and almost mystical atmosphere.

In addition the light emitting mechanism 49 can be controlled by a microprocessor 48 in order to make multicolored light displays, chasing lights, dancing lights, etc. This has commercial value as many including young people enjoy watching various light displays interacting within the liquid which are then reflected onto the external environment of the said filtration system.

Another important use for the light emitting mechanism 49 is for the use of ultra violet light. This type of light kills pathogenic organisms thus enabling the passive freestanding portable liquid filtration device to filter inert contaminates from liquids and to further purify the liquids by killing unwanted bacteria, virus, parasites, cysts and other microscopic organisms. Often it is desirable to run a liquid through several cycles of filtration to achieve a particular level of desired purity. The light emitting mechanism 49 assists with this process by illuminating residual contaminates and particulate within the filtered liquids, and by revealing the color and clarity of the filtered liquids. Thus if needed the user can recycle the filtered liquid through the passive freestanding portable liquid filtration device with the light emitting mechanism 49 until the desired color, clarity and degree of particulate removal have been achieved. Many filtration elements for these types of systems have a hard but fragile exterior such as when ceramic is used. When dropped or jarred the filtration element can break a seal and or form a crack in the fragile exterior that is not visible to the naked eye. When this occurs there is a breech in the filter and the liquid will channel through the breech without being filtered. The present invention in the preferred embodiment in conjunction with the light emitting mechanism(s) is capable of illuminating impurities, color, clarity and particulate within the liquid so that the user can more readily detect when a filtration element(s) 26 is malfunctioning, defective or has been breached or become exhausted. When used to filter water supplies containing waterborne diseases this benefit of the invention can potentially save many lives.

The light emitting mechanism 49 is very flexible in that it can be powered in numerous ways. The internal rechargeable batteries 46 can power it. The batteries 46 can be rechargeable or non-rechargeable. It can be powered an auxiliary battery pack 37 of FIG. 4. The batteries 46 may be rechargeable or non-rechargeable. The light emitting mechanism 49 may also be powered by a standard electrical outlet power through the use of the electrical power supply device of FIG. 7 and by other sources of power such as by a solar power device FIG. 6. It can also be powered by any combination of the above.

Rechargeable batteries 46 can be utilized in the portable filter 18. The solar power device 51 of FIG. 6 is preferable in situations where there is difficulty finding access to batteries or electricity. In situations where the users need requires that the light emitting mechanism 49 be operated continuously or for long periods of time the electrical power supply device of FIG. 7 is preferable. The electrical power supply device of FIG. 7 and the solar power device 51 of FIG. 6 may be used to charge the rechargeable batteries 46. The ability of the light emitting mechanism 49 to be powered by rechargeable batteries 46 makes the system an ideal emergency or backup source of light in no or low light situations. This is a valuable feature in outdoor recreational applications as well as for emergency situations.

The pre filtration device 53 of FIG. 5 is an innovation for use in situations where in the liquid being filtered is so turbid that it could threaten to clog up the filtration elements 26. The user places the said device 53 on the top of the upper housing 24 so that the pre filtration screen 56 fits down into the opening 24e of the upper housing 24 and is then held in place by the nesting rim 54. The turbid liquids to be filtered are then poured by the user into the pre filtration screen 56 where the larger particulate is captured and separated from the liquid. The liquid flows through the filtration screen 56 and into the upper housing 24 to be filtered.

The portable carrying case 57 is designed to hold and transport all of the components of the passive freestanding portable liquid filtration device 18 and the above mentioned accessories. This makes it easy to transport the device 18 and accessories from location to location without the fear of losing or damaging the various components of the filtration device 18 and the accessories.

For situations like repair or service vehicles, military vehicles, RV or motor home travel or where counter space may not be available, the vertical mount bracket 62 of FIG. 10 is designed to mount onto a vertical surface such as a wall. The mounting backboard 62 is secured to the vertical surface by a fastening device, such as a screw, utilizing the backboard fastening holes 62a. The attachable and detachable base 36 of the passive freestanding portable liquid filtration device 18 is then seated into a vertical mount platform cavity 66a within the vertical mount platform 66 and is then further secured by a securing straps 64.

The freestanding pedestal stand 67 of FIG. 11 is designed for situations in which the user desires a freestanding pedestal. The attachable and detachable base 36 of the passive freestanding portable liquid filtration device 18 is seated into a pedestal platform cavity 68a within the pedestal platform 68.

The siphon priming and back flushing device 73 of FIG. 12 is designed for both siphon priming and back flushing filtration elements 26. The device 73 when used as a siphon primer works by forcing liquids into the interior bore of the filtration elements 26, which replaces air within the interior bore of the filtration elements with liquid. The device 73 is then disconnected from the filtration elements 26. When filtering begins a siphon pull is created. As liquids exit the filtration elements 26, new liquid is pulled into the filtration elements 26. Thus, a siphon "pull" on the liquid is achieved coupled with the "push" of gravity. Depending on the liquid, this results in an increased efficiency of 100–300%, with respect to the speed of liquid filtration, as compared to the efficiency experienced by the use of gravity alone to move liquids through the filtration elements 26.

The device 73, when used as a back flushing device is designed for back flushing filtration elements 26 by forcing liquids through the interior of the filtration elements 26 and to exit the exterior. This reverse flow forces trapped contaminates out of the pore structure of the filtration elements 26, thus extending its useful life.

Accordingly the reader will see that the improved invention of my passive freestanding portable liquid filtration device 18 can be used to filter various liquids in environments where outside influences, such as electricity and water pressure, which are typically relied upon in typical filtration processes are not available. The improvements make the filtration device 18 more flexible and adaptable to many otherwise hostile filtration environments while it provides a more reliable, user friendly, yet economical passive freestanding portable liquid filtration device that can enhance the ambience and atmosphere while in the process of filtering liquids.

Furthermore the passive freestanding portable liquid filtration device 18 has the additional advantages in that it permits the light emitting mechanism 49 to be powered by rechargeable batteries, non rechargeable batteries, an auxiliary battery pack, standard electrical current, solar power, etc. The passive freestanding portable liquid filtration device 18 permits the rechargeable batteries to be charged in environments where standard electrical current is unavailable. The passive freestanding portable liquid filtration device 18 permits the use of the light emitting mechanism for long periods of time. The light emitting mechanism 49 provides an emergency source of light. The passive freestanding portable liquid filtration device 18 provides a means to optimize the use of the system during no or low light conditions.

The passive freestanding portable liquid filtration device 18 provides an easy means to determine if the liquids should be recycled for repeat filtration cycles. The passive freestanding portable liquid filtration device 18 provides a means of verifying the filtration elements 26 are working properly and have not incurred a breach. The passive freestanding portable liquid filtration device 18 permits post treatment of the filtered liquids with an ultra violet post treatment light. The passive freestanding portable liquid filtration device creates interesting luminous effects as the droplets of filtered liquid and the surface waves to light up and glow reflecting light within the housing and onto the surface area of walls, ceilings and other objects. While in operation, the passive freestanding portable liquid filtration device 18 produces the soothing sound of rain drops. This along with the lighting effects combine to create a very compelling, relaxing and almost mystical atmosphere.

The passive freestanding portable liquid filtration device 18 permits a convenient means of verifying liquid levels within the housings 24 and 32. The passive freestanding portable liquid filtration device 18 provides a means for deflecting unfiltered liquid, due to overflow of the upper housing 24, from entering into the lower housing 32 and contaminating the filtered liquids. The passive freestanding portable liquid filtration device 18 permits the filtered liquids to be discharged into a container while the system is situated directly on the ground or anywhere on a flat surface. The passive freestanding portable liquid filtration device 18 is able to be secured to a vertical surface or pedestal. The passive freestanding portable liquid filtration device 18 is conveniently portable while filtration of liquids is taking place. The passive freestanding portable liquid filtration device 18 permits the filtration of liquids while in transit. The passive freestanding portable liquid filtration device 18 provides a method for pre-filtering turbid liquids preventing them from clogging the filtration elements. The passive freestanding portable liquid filtration device 18, with respect to the speed of liquid filtration, can increase the efficiency by 100–300% as compared to the efficiency experienced by other gravity filtration devices. The passive freestanding portable liquid filtration device's filtration elements 26 can be back flushed thus prolonging the useful life of its filtration elements 26.

There can be additional chambers for multistage filtration of liquids such as an upper chamber which utilizes specialized filtration elements for removing chemicals from the liquid, a middle chamber that utilizes specialized filtration elements for removing minerals from the liquid and a lower chamber that collects the filtered liquid and a base. Additionally, one or a number of filter elements may be used in a portable filtration device according to the present invention.

Although the description above contains many specificities, these should not be construed as limiting the scope of the invention but as merely providing illustrations of some of the presently preferred embodiments of this invention. For example, the upper housing, lower housing and base may be of various colors, including transparent blue or yellow, and other translucent or opaque colors, and may also be of various shapes, such as square, oval, trapezoidal, triangular, etc.; the flow control valve can be replaced with an exit tube or hose; the lid and pre-filter screen can be combined into one mechanism etc. Although the preferred embodiment has been described in detail, it should be understood that various changes, substitutions and alterations can be made therein without departing from the spirit and scope of the invention as defined by the appended claims.

What is claimed is:

1. A freestanding portable liquid filtration device comprising:
    an upper housing having an upper end, an enclosed lower end and an upper housing sidewall, said upper housing interiorly defining an upper chamber, and said enclosed lower end of said upper housing at least one aperture extending there through;
    a lower housing having an open top, an enclosed bottom and a lower housing sidewall, said lower housing interiorly defining a lower chamber, and said lower housing further having a lower housing sidewall with at least one discharge port disposed in a lower portion of said lower housing;
    said enclosed lower end of said upper housing and said open top of said lower housing being configured for fitting a portion of said lower end of said upper housing into an upper portion of said open top of said lower housing;
    a filtration element, said filtration element having a first portion through which fluid passes into said filtration element, a second portion from which fluid is discharged from within said filtration element, and an end portion with an annular-shaped shoulder which extends circumferentially around said end portion;
    wherein said filtration element is disposed with said first portion of said filtration element in fluid communication with said upper chamber, and with said second portion of said filtration element in fluid communication with said lower chamber;
    wherein liquid disposed within said upper chamber will flow through said first portion of said filtration element, through said filtration element, into said second portion of said filtration element and into said lower chamber in response to gravity, such that the liquid passes through said aperture in said lower portion of said upper chamber and into said lower chamber defined within said lower housing;
    a base having an upwardly facing opening for fitting said bottom of said lower housing within said upwardly facing opening; and
    wherein said base includes a light source which illuminates of said lower housing.

2. The freestanding portable filtration device according to claim 1, further comprising a lid for covering said upper end of said upper chamber.

3. The freestanding portable filtration device according to claim 1, further comprising at least one rib which circumferentially extends exteriorly around and radially outward of said upper housing sidewall for deflecting liquid outward from said upper housing sidewall.

4. The freestanding portable filtration device according to claim 1, further comprising a pre-filtration device comprising a rim and a screen portion, wherein said rim is disposed on said upper end of said upper chamber with said screen portion extending downward into said upper chamber such that the liquid disposed within said screen portion will flow into said upper chamber.

5. The freestanding portable filtration device according to claim 1, wherein said upper housing and lower housing are formed of a transparent material, such that a level of the liquid in the upper and lower containers may be observed through the upper sidewall and the lower sidewall.

6. The freestanding portable filtration device according to claim 1, wherein said light source is an ultraviolet light source.

7. The freestanding portable filtration device according to claim 1, further comprising a control means for controlling operation of said light source.

8. A freestanding portable liquid filtration device comprising:
    an upper housing having an open upper end, an enclosed lower end and an upper housing sidewall, said upper housing interiorly defining an upper chamber, and said enclosed lower end of said upper housing having at least one aperture extending there through and at least one lateral protuberance exteriorly extending from said enclosed lower end of said upper housing;

a lower housing having an open top, an enclosed bottom and a lower housing sidewall, said lower housing interiorly defining a lower chamber, and said lower housing further having a lower housing sidewall with a discharge port disposed in a lower portion of said lower housing sidewall;

said enclosed lower end of said upper housing and said open top of said lower housing being configured for fitting said enclosed lower end and said at least one lateral protuberance within said top of said upper housing with an interference fit, with said upper housing disposed atop said lower housing;

a filtration element, said filtration element having an exterior portion through which fluid passes into said filtration element, an interior portion from which fluid is discharged from within said filtration element, a lower end portion with an annular-shaped shoulder which extends circumferentially around said lower end portion;

wherein said filtration element is disposed within said upper chamber, adjacent to said aperture in said enclosed lower end of said upper housing, and with said lower end portion of said filtration element extending through said aperture in said enclosed lower end of said upper housing and into said lower housing;

a seal disposed between said annular shoulder of said filtration element and said lower end of said upper housing to sealingly engage there between in response to said lower end portion of said filtration element being threadingly secured to a fastener disposed beneath said enclosed lower end of said upper housing;

wherein liquid disposed within said upper chamber will flow through said exterior portion of said filtration element, through said filtration element, into said interior portion of said filtration element and then into said lower chamber in response to gravity;

a control valve extending within said discharge port, secured to said lower housing sidewall, and operable for controlling fluid flow from within said lower chamber; and a base having an upwardly facing opening for fitting said bottom of said lower housing within said upwardly facing opening in an interference fit.

9. The freestanding portable filtration device according to claim 8, further comprising a lid which covers said open upper end of said upper chamber.

10. The freestanding portable filtration device according to claim 8, further comprising at least one rib which circumferentially extends exteriorly around and radially outward of said upper housing sidewall for deflecting liquid outward from said upper housing sidewall.

11. The freestanding portable filtration device according to claim 8, further comprising a pre-filtration device comprising a rim and a screen portion, wherein said rim is disposed in said open upper end of said upper chamber with said screen portion extending downward into said chamber such that the liquid disposed within said screen portion will flow into said upper chamber.

12. The freestanding portable filtration device according to claim 8, wherein said upper housing and lower housing are formed of a transparent material, such that a level of the liquid in the upper and lower containers may be observed through the upper sidewall and the lower sidewall.

13. The freestanding portable filtration device according to claim 8, wherein said base includes a light source which illuminates said lower housing.

14. The freestanding portable filtration device according to claim 13, wherein said light source is an ultraviolet light source.

15. The freestanding portable filtration device according to claim 13, further comprising a control means for controlling operation of said light source.

16. A freestanding portable liquid filtration device comprising:

an upper housing having an open upper end, an enclosed lower end and an upper housing sidewall, said upper housing sidewall having a plurality of circumferentially extending upper housing ribs which outwardly extending from an exterior of said upper housing sidewall, said upper housing interiorly defining an upper chamber, and said enclosed lower end of said upper housing having at least one aperture extending there through and at least one lateral protuberance exteriorly extending from said enclosed lower end of said upper housing;

a lower housing having an open top, an enclosed bottom and a lower housing sidewall, said lower housing interiorly defining a lower chamber, said open top defining a lower housing rim at a terminal end of said lower housing sidewall, and said lower housing sidewall further having a plurality of circumferentially extending lower housing ribs which outwardly extend from said lower housing sidewall and a discharge port disposed in a lower portion of said lower housing sidewall, and said enclosed bottom having at least one exterior protuberance which laterally extends from said enclosed bottom;

said enclosed lower end of said upper housing and said open top of said lower housing being configured for fitting said enclosed lower end and said at least one lateral protuberance within said top of said upper housing with an interference fit, with said upper housing disposed atop said lower housing with a lowermost one of said circumferentially extending upper ribs extending laterally outward of said lower housing rim;

a filtration element having an exterior portion through which fluid passes into said filtration element, an interior portion from which fluid is discharged from within said filtration element, a protuberant lower end portion with external threads, and an annular-shaped shoulder which extends circumferentially around said protuberant lower end portion;

wherein said filtration element is disposed to extend through said at least one aperture in said lower end of said upper housing, with said protuberant lower end portion threadingly secured to a fastener disposed beneath said enclosed lower end of said upper housing;

a seal disposed between said annular shoulder of said filtration element and said lower end of said upper housing to sealingly engage there between in response to said protuberant lower end portion of said filtration element being threadingly secured to said fastener disposed beneath said enclosed lower end of said upper housing;

wherein said upper chamber is in fluid communication with said exterior portion of said filtration element, and said interior portion of said filtration element is in fluid communication with said lower chamber, such that a liquid disposed within said upper chamber will flow through said exterior portion of said filtration element, through said filtration element, into said interior portion of said filtration element and then into said lower chamber;

a control valve secured in said discharge port, and operable for controlling fluid flow from within said lower chamber;

a base having an upwardly facing opening which defines a base rim at an uppermost, terminal end portion of said base, and said upwardly facing opening further having an interiorly disposed, horizontally extending profile which has an oval shape, and said upwardly facing opening being sized for fitting said enclosed bottom and said at least one exterior protuberance of said enclosed bottom of said lower housing with an interference fit to secure said lower housing within said upwardly facing opening of said base, and with said lower housing disposed atop said base with a lowermost one of said circumferentially extending lower ribs extending laterally outward of said base rim; and a light source which illuminates at least one of said upper housing and said lower housing.

17. The freestanding portable filtration device according to claim 16, wherein said light source comprises an ultraviolet light source.

18. The freestanding portable filtration device according to claim 17, further comprising a pre-filtration device comprising a rim and a screen portion, wherein said rim is disposed in said open end of said upper chamber with said screen portion extending downward into said chamber such that the liquid disposed within said screen portion will flow into said upper chamber.

19. The freestanding portable filtration device according to claim 18, further comprising a lid which is secured in said open upper end of said upper housing.

20. The freestanding portable filtration device according to claim 19, wherein said upper and lower housings are formed of a transparent polycarbonate material, such that a level of the liquid in the upper and lower containers may be observed through the upper sidewall and the lower sidewall.

21. The freestanding portable filtration device according to claim 20, further comprising control means for controlling operation of said light source.

* * * * *